(12) United States Patent
Marcoe et al.

(10) Patent No.: US 10,737,446 B2
(45) Date of Patent: Aug. 11, 2020

(54) PROCESS CONTROL OF A COMPOSITE FABRICATION PROCESS

(71) Applicant: The Boeing Company, Chicago, IL (US)

(72) Inventors: Jeffery Lee Marcoe, Bellevue, WA (US); Jan Wei Pan, Madison, AL (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 15/581,432

(22) Filed: Apr. 28, 2017

(65) Prior Publication Data

US 2018/0311914 A1 Nov. 1, 2018

(51) Int. Cl.
*B32B 41/00* (2006.01)
*B29C 70/38* (2006.01)
*G05B 19/418* (2006.01)
*B29K 105/08* (2006.01)
*B25J 9/16* (2006.01)
(Continued)

(52) U.S. Cl.
CPC ............ *B29C 70/386* (2013.01); *B29C 70/38* (2013.01); *G05B 19/41875* (2013.01); *B25J 9/1684* (2013.01); *B29K 2105/0872* (2013.01); *G01N 2021/8472* (2013.01); *G05B 19/4207* (2013.01); *G05B 2219/32191* (2013.01); *G05B 2219/32194* (2013.01); *G05B 2219/37198* (2013.01); *G05B 2219/37208* (2013.01)

(58) Field of Classification Search
CPC . B29C 70/386; B29C 70/38; G05B 19/41875; G05B 2219/37208; G05B 2219/37198; G05B 2219/32194; G05B 2219/32191; G05B 19/4207; G01N 21/8851; G01B 2021/8472; B25J 9/1684; B29K 2105/0872

USPC ............................ 156/64, 350, 351, 378, 379
See application file for complete search history.

(56) References Cited

U.S. PATENT DOCUMENTS 5,562,788 A 10/1996 Kitson et al.
6,064,429 A 5/2000 Belk et al.
(Continued)

FOREIGN PATENT DOCUMENTS

EP 2730914 A1 5/2014
EP 3007022 A2 4/2016
(Continued)

OTHER PUBLICATIONS

European Patent Office Extended Search Report, dated Sep. 20, 2018, regarding Application No. 18166494.7, 8 pages.

*Primary Examiner* — Michael N Orlando
*Assistant Examiner* — Joshel Rivera
(74) *Attorney, Agent, or Firm* — Yee & Associates, P.C.

(57) ABSTRACT

A system for process control of a composite fabrication process comprises an automated composite placement head, a vision system, and a computer system. The automated composite placement head is configured to lay down composite material. The vision system is connected to the automated composite placement head and configured to produce image data during an inspection of the composite material, wherein the inspection takes place at least one of during or after laying down the composite material. The computer system is configured to identify inconsistencies in the composite material visible within the image data, and make a number of metrology decisions based on the inconsistencies.

23 Claims, 8 Drawing Sheets

(51) Int. Cl.
    *G05B 19/42*     (2006.01)
    *G01N 21/84*     (2006.01)

(56)     References Cited

U.S. PATENT DOCUMENTS

| | | |
|---|---|---|
| 7,236,625 B2 | 6/2007 | Engelbart et al. |
| 7,424,902 B2 | 9/2008 | Engelbart et al. |
| 7,576,850 B2 | 8/2009 | Engelbart et al. |
| 7,678,214 B2 | 3/2010 | Engelbart et al. |
| 7,688,434 B2 | 3/2010 | Engelbart et al. |
| 7,712,502 B2 | 5/2010 | Engelbart et al. |
| 8,068,659 B2 | 11/2011 | Engelbart et al. |
| 8,524,021 B2 | 9/2013 | Engelbart et al. |
| 8,770,248 B2 | 7/2014 | Engelbart et al. |
| 2006/0108048 A1 | 5/2006 | Engelbart et al. |
| 2016/0341671 A1* | 11/2016 | Maass ................ G01N 21/8851 |
| 2017/0030886 A1 | 2/2017 | Engel |

FOREIGN PATENT DOCUMENTS

| | | |
|---|---|---|
| WO | WO2005036634 A2 | 4/2005 |
| WO | WO2010132998 A1 | 11/2010 |

\* cited by examiner

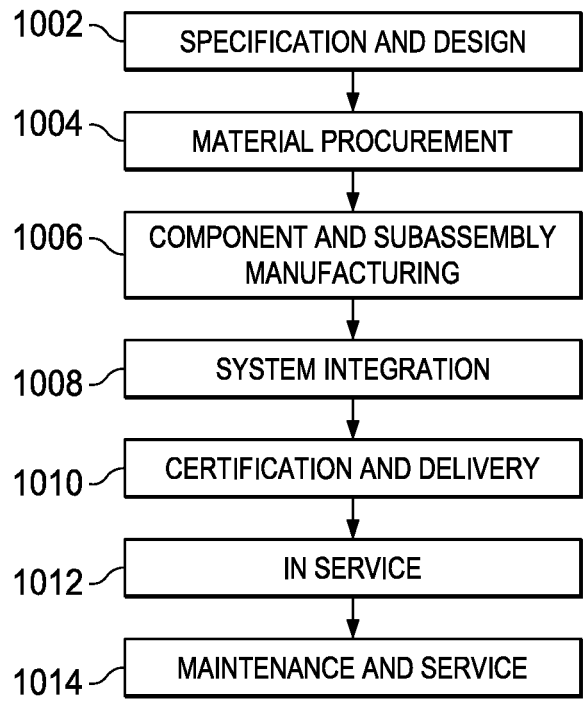
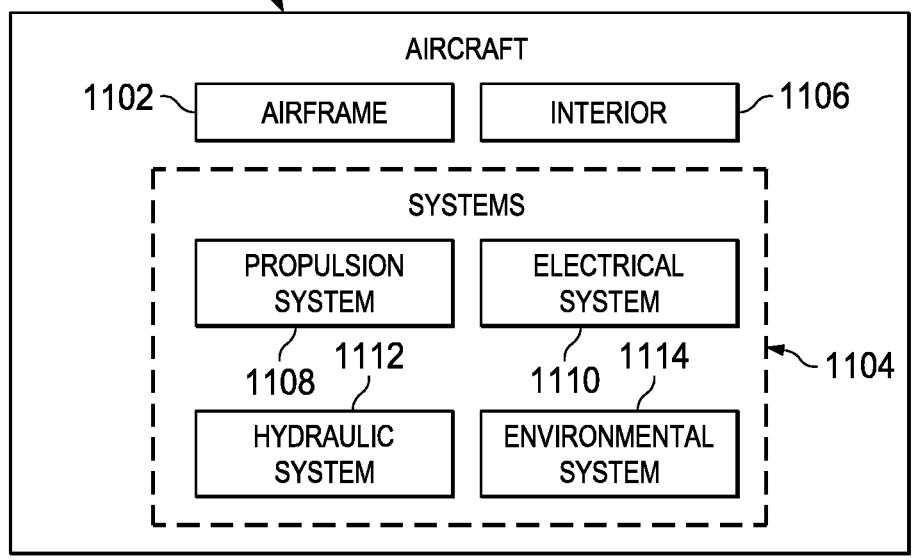

PROCESS CONTROL OF A COMPOSITE FABRICATION PROCESS

BACKGROUND INFORMATION

1. Field

The present disclosure relates generally to inspection and, more specifically, to the inspection of composite materials. Still more particularly, the present disclosure relates to using inspection data for process control of a composite fabrication process.

2. Background

Composite materials are laid down by an automatic material placement process into layers, called plies. After laying down a ply, the ply is manually inspected for inconsistencies. The inconsistencies may occur as part of a composite manufacturing process and may include foreign object debris (FOD), fuzz balls, resin balls, twisted tows, folded tows, slit tape tow "chips," missing tows, damaged tows, wrinkles, puckers, end of ply inconsistencies, gaps, laps, or any other undesirable feature introduced in the ply. Each component has a tolerance for an acceptable size of inconsistencies. After inspection, a size of inconsistencies may be compared to the tolerance for the component.

A manual inspection of a composite ply may take an undesirable amount of time to complete. Additional plies are not laid down until an inspection is completed. Thus, the manual inspection of the ply may add an undesirable amount of time to an overall manufacturing time.

For large components, accessing the composite ply for the manual inspection may be undesirably difficult. For some large parts, lifting platforms may be used. Moving the lifting platforms relative to the large parts may add an undesirable amount of time to the inspection process.

Further, for some large components, a ply may be inspected by an operator walking across the component. By walking across the surface of the component, the operator may introduce additional inconsistencies to the ply or other plies of the component. Therefore, it would be desirable to have a method and apparatus that take into account at least some of the issues discussed above, as well as other possible issues.

SUMMARY

An illustrative embodiment of the present disclosure provides a system for process control of a composite fabrication process. The system comprises an automated composite placement head, a vision system, and a computer system. The automated composite placement head is configured to lay down composite material. The vision system is connected to the automated composite placement head and configured to produce image data during an inspection of the composite material, wherein the inspection takes place at least one of during or after laying down the composite material. The computer system is configured to identify inconsistencies within the image data, and make a number of metrology decisions based on the inconsistencies.

Another illustrative embodiment of the present disclosure provides a method. A composite material is automatically imaged, during or after laying down the composite material, using a vision system to form image data. A computer system identifies inconsistencies in the composite material visible within the image data in real-time. The computer system makes a number of metrology decisions based on the inconsistencies.

A further illustrative embodiment of the present disclosure provides a method. Image data of a composite material is created using a vision system. A computer system identifies inconsistencies in the composite material visible within the image data in real-time. The image data is displayed on a display in real-time with a width and a length superimposed over each of the inconsistencies that is visible within the image data on the display.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is an illustration of an aircraft manufacturing and service method in the form of a block diagram in accordance with an illustrative embodiment; and FIG. 11 is an illustration of an aircraft in the form of a block diagram in which an illustrative embodiment may be implemented.

DETAILED DESCRIPTION

Figure 1:
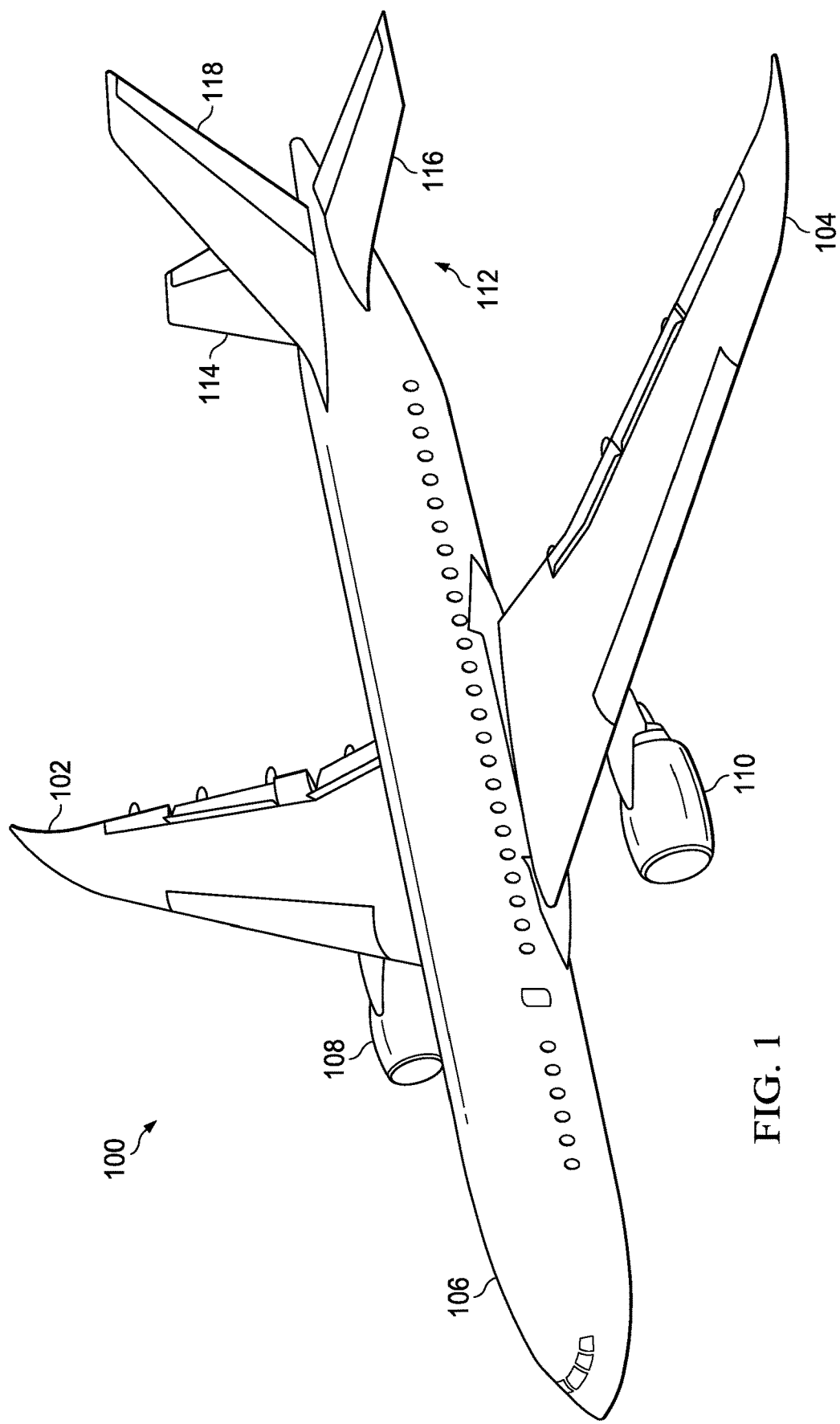
FIG. 1 is an illustration of an aircraft in which an illustrative embodiment may be implemented.

The illustrative embodiments recognize and take into account one or more different considerations. For example, the illustrative embodiments recognize and take into account that there are methods of automated composite inspection. The illustrative embodiments also recognize and take into account that conventional methods of inspection may return an inconsistency location, an inconsistency size, or an inconsistency type. However, the illustrative embodiments also recognize and take into account that conventional automated composite inspections may not identify all types of inconsistencies. Further, the illustrative embodiments recognize and take into account that the conventional automated composite inspections provide in-tolerance or out-of-tolerance judgments using only data for the inconsistencies in an inspected ply.

The illustrative embodiments recognize and take into account that it may be desirable to provide a composite inspection that takes into account more variables than a conventional inspection process. The illustrative embodiments recognize and take into account that taking into account historical data of other composite components or inconsistency data for other layers of a same composite structure may be desirable in composite inspections. For example, taking into account a quantity of inconsistencies in other composite plies in a same relative location of a component may be desirable. As another example, taking into account performance data for other components with a comparable number or type of inconsistencies in a substantially similar location as a current component may be desirable.

The illustrative embodiments recognize and take into account that it may be desirable to provide process control during fabrication of a composite component. The illustrative embodiments recognize and take into account that process control during fabrication of a composite component may provide information for fabrication of other composite structures. For example, the illustrative embodiments recognize and take into account that utilizing process control reduces at least one of manufacturing costs or manufacturing time of the composite component and other composite structures.

For example, the illustrative embodiments recognize and take into account that utilizing process control during composite fabrication may reduce inspection and rework labor costs for each composite component manufactured in the manufacturing environment. Each composite component may have in situ inspection in combination with process control to reduce inspection time. By monitoring manufacturing equipment status using process control, rework may be reduced by performing maintenance prior to manufacturing equipment introducing inconsistencies that could be preventable through maintenance.

Additionally, the illustrative embodiments recognize and take into account that monitoring manufacturing equipment status using process control, throughput in a factory may be increased by reducing or eliminating equipment downtime for equipment inspection. The illustrative examples recognize and take into account that performing inspections in situ reduces equipment downtime for composite component inspection. The illustrative embodiments recognize and take into account that production rates in a factory may be increased by reducing equipment downtime for composite component inspection.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an example of an aircraft manufactured using process control of a composite fabrication process. For example, at least one of body 106, wing 102, or wing 104 includes composite materials. The illustrative embodiments may be utilized during the manufacturing of at least one of body 106, wing 102, or wing 104 to provide process control. For example, a computer system as described may identify inconsistencies in a composite material visible within image data for at least one of body 106, wing 102, or wing 104, and make a number of metrology decisions based on the inconsistencies. As used herein, "a number of," items means one or more items. For example, "a number of metrology decisions" is one or more metrology decisions.

This illustration of aircraft 100 is provided for purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable structures.

Figure 2:
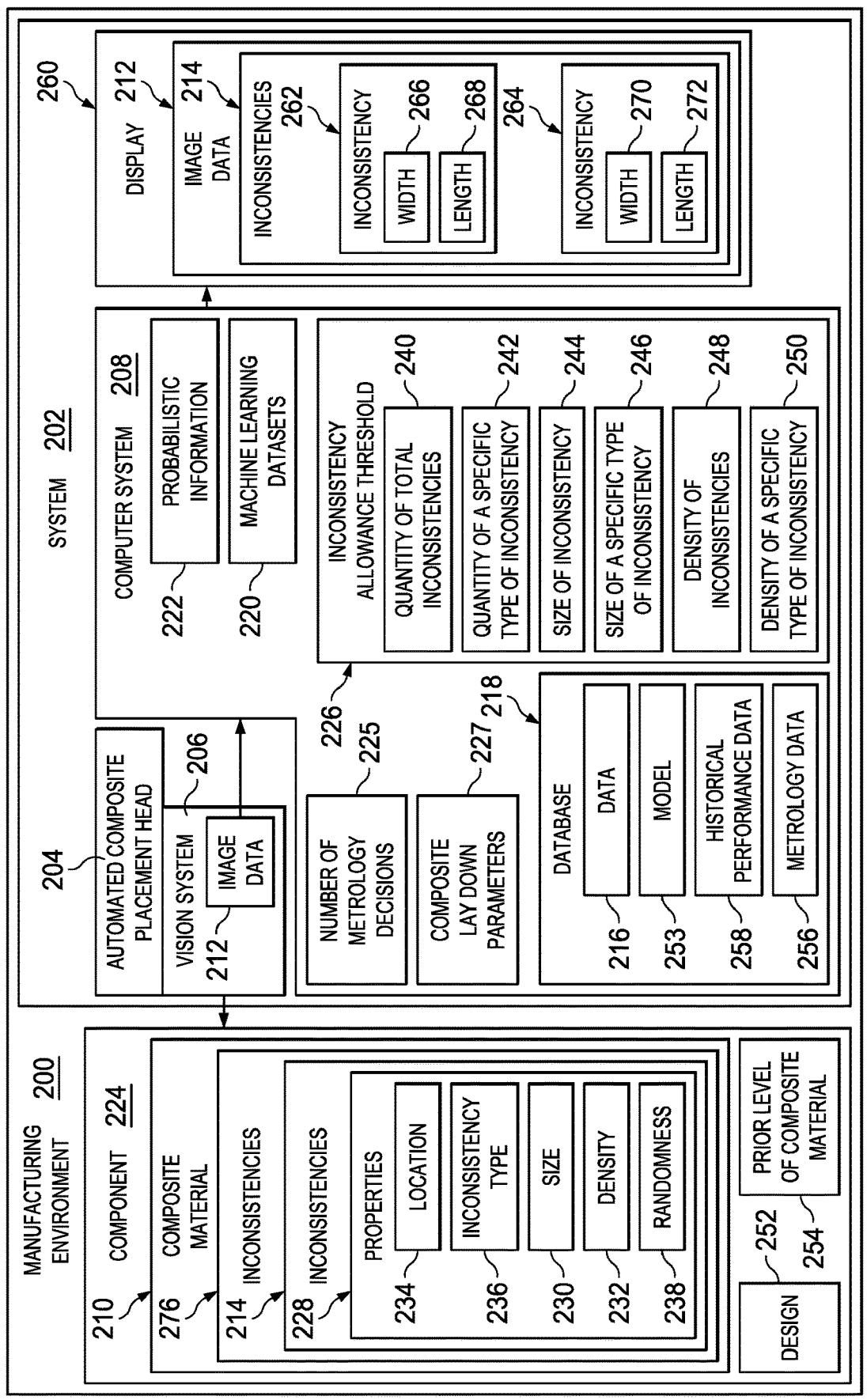
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is a depiction of an environment in which an aircraft or components of the aircraft, such as aircraft 100, may be manufactured.

System 202 for process control of a composite fabrication process is present in manufacturing environment 200. System 202 comprises automated composite placement head 204, vision system 206, and computer system 208. Automated composite placement head 204 is configured to lay down composite material 210. Composite material 210 may take any desirable form, including, but not limited to, at least one of prepreg tape, dry fibers, prepreg fibers, dry preforms, tows, slits, sheets, or any other desirable form of composite material. Automated composite placement head 204 may take the form any desirable placement system for the type of composite material 210. For example, automated composite placement head 204 may be selected from at least one of automated fiber placement (AFP), contoured tape laminating machine (CLTM), automated laminating machine (ALM), automated fiber placement machine (AFPM) or any other desirable type of composite placement system.

Vision system 206 is connected to automated composite placement head 204 and is configured to produce image data 212 during an inspection of composite material 210. Vision system 206 may take any desirable form. Vision system 206 may include at least one of a still camera, a video camera, a backscatter vision system, an infrared camera, a hyperspectral imaging camera, Light Detection and Ranging (LiDAR) sensors, or any other desirable type of vision sensor. The inspection takes place at least one of during or after laying down composite material 210. Computer system 208 is configured to identify inconsistencies 214 in composite material 210 visible within image data 212, and make number of metrology decisions 225 based on inconsistencies 214.

Computer system 208 is configured to make number of metrology decisions 225 in real time. When composite material 210 is imaged during lay down, computer system 208 is configured to make number of metrology decisions 225 in-process, while composite material 210 is being laid down. Computer system 208 is configured to make number of metrology decisions 225 automatically, without operator intervention.

Inconsistencies 214 may be any type of inconsistency. For example, inconsistencies 214 includes at least one of foreign object debris (FOD), fuzz balls, resin balls, twisted tows, folded tows, slit tape tow "chips," missing tows, damaged tows, wrinkles, puckers, end of ply inconsistencies, gaps, laps, or any other undesirable feature introduced in the ply. In some illustrative examples, computer system 208 is configured to identify all types of inconsistencies.

In some illustrative examples, computer system 208 is configured to identify only designated types of inconsistencies. For example, computer system 208 may be configured to identify foreign object debris (FOD). As another example, computer system 208 may be configured to identify foreign object debris (FOD), fuzz balls, or resin balls.

In some illustrative examples, computer system 208 is configured to identify all types of inconsistencies, but configured to not further process designated types of inconsistencies. For example, computer system 208 may be configured to only measure or mark designated types of inconsistencies.

Computer system 208 may change configurations based on at least one of type of composite material, a design/configuration of the component, a location on component 224, or any other desirable characteristic. In one illustrative example, computer system 208 may change configurations between prior level of composite material 254 and composite material 210.

In some illustrative examples, computer system 208 is further configured to measure inconsistencies 214. Measurements of inconsistencies 214 may have any desirable tolerance. In some illustrative examples, measuring inconsistencies 214 identified in image data 212 comprises measuring inconsistencies 214 to the nearest ±0.01 inch. In some illustrative examples, measuring inconsistencies 214 identified in image data 212 comprises measuring inconsistencies 214 to the nearest ±0.10 inch.

In some illustrative examples, each of inconsistencies 214 is measured directly from a respective contour identified using image processing. In other illustrative examples, markers superimposed onto inconsistencies 214 may be measured to identify a width and length.

Computer system 208 is further configured to store data 216 for inconsistencies 214 in database 218. Computer system 208 is configured to build machine learning datasets 220 and probabilistic information 222 using database 218. Computer system 208 is additionally configure to use machine learning datasets 220 and probabilistic information 222 to forecast a quality of a portion of component 224 containing composite material 210.

In some illustrative examples, an inspection is performed as automated composite placement head 204 lays down composite material 210. In these illustrative examples, computer system 208 is configured to make number of metrology decisions 225 while automated composite placement head 204 is laying down composite material 210.

The number of metrology decisions 225 may be any desirable action. In one example, number of metrology decisions 225 may be sending a warning. In another illustrative example, number of metrology decisions 225 may be modifying inconsistency allowance threshold 226 for component 224. In yet a further example, number of metrology decisions 225 may be modifying an inconsistency allowance threshold for a plurality of components. In some illustrative examples, a metrology decision may be to stop using a specific tool. Number of metrology decisions 225 may be at least one of setting inconsistencies "not to count," setting inconsistencies "to count," identifying component 224 for rework, or requesting maintenance of a specific tool.

In some illustrative examples, a metrology decision includes adjusting composite lay down parameters 227 for a current or future ply. For example, a metrology decision may be to change at least one of lay down speed, lay down angle, composite compaction pressure, heat applied during lay down, cutting speed, cutting angle for a current or future ply. In some illustrative examples, composite lay down parameters 227 of the current ply are changed in real time. In these illustrative examples, composite lay down parameters 227 for a composite material are changed as the composite material is being laid down. In some illustrative examples, number of metrology decisions 225 comprises adjusting composite lay down parameters for composite material 210 or a future ply.

Computer system 208 is configured to analyze image data 212 and make a decision to change composite lay down parameters 227 independent of a human operator. Computer system 208 is configured to analyze image data 212 and determine if changing composite lay down parameters 227 is desirable in-real time.

Number of metrology decisions 225 comprises modifying inconsistency allowance threshold 226 for component 224. When number of metrology decisions 225 comprises modifying an inconsistency allowance threshold for a plurality of components, the components may be selected based on a composite level, a specific tool, a type of inconsistency or any other desirable criteria.

In some illustrative examples, number of metrology decisions 225 comprises setting consistencies "not to count," or "to count." When inconsistencies are set "not to count," these inconsistencies are not used in evaluating component 224 against an inconsistency allowance threshold, such as inconsistency allowance threshold 226. When inconsistencies are set "to count," the inconsistencies are used in evaluating component 224 against an inconsistency allowance threshold, such as inconsistency allowance threshold 226. In some illustrative examples, when inconsistencies are set "not to count," this may reduce the quantity of inconsistency allowance thresholds being used to evaluate component 224. Inconsistencies set "not to count," may be described by any desirable combination of characteristics. For example, inconsistencies set "not to count," may be described by a type of inconsistency, a size of inconsistency, a type of inconsistency in a specific level of composite material of component 224, a size of inconsistency in a specific level of composite material of component 224, a location of inconsistencies within a design of component 224, or any other desirable characteristic.

Computer system 208 is configured to employ a probabilistic approach to modify inconsistency allowance threshold 226 while imaging composite material 210. Inconsistency allowance threshold 226 is modified based on at least one property of inconsistencies 214 identified in image data 212, wherein properties 228 of inconsistencies 214 include at least one of size 230, density 232, location 234, inconsistency type 236, or randomness 238.

Inconsistency allowance threshold 226 is used to evaluate component 224. Values over inconsistency allowance threshold 226 may trigger a warning, generate a report, stop laying down composite material 210, or trigger a rework.

Inconsistency allowance threshold 226 may include any desirable characteristics of inconsistencies, such as inconsistencies 214. Inconsistency allowance threshold 226 may be relevant to all or a portion of composite material 210.

Inconsistency allowance threshold 226 includes at least one of quantity of total inconsistencies 240, quantity of a specific type of inconsistencies 242, size of an inconsistency 244, size of a specific type of inconsistency 246, density of inconsistencies 248, or density of a specific type of inconsistency 250. Inconsistency allowance threshold 226 may be set for any portion of component 224. In some illustrative examples, inconsistency allowance threshold 226 is applied to all of composite material 210. In another illustrative example, inconsistency allowance threshold 226 is applied to only a portion of composite material 210.

In modifying inconsistency allowance threshold 226, the value of inconsistency allowance threshold 226 is increased or decreased. For example, when inconsistency allowance threshold 226 includes quantity of a specific type of inconsistencies 242, the allowable quantity may be increased or decreased for that specific type of inconsistency to modify inconsistency allowance threshold 226. As another example, when inconsistency allowance threshold 226 is size of an inconsistency 244, a maximum allowable size for any inconsistency is increased or decreased to modify inconsistency allowance threshold 226.

When composite material 210 is a part of component 224, computer system 208 is configured to compare locations of inconsistencies 214 identified in image data 212 to design 252 of component 224. Design 252 of component 224 includes desired locations of portions of component 224. Design 252 includes dimensions and positioning of composite material 210 within component 224. Design 252 also includes dimensions and positioning of additional portions of component 224. For example, component 224 may also include metallic components, electronic components, or other composite components. Design 252 of component 224 may be expressed as model 253 in database 218.

In one illustrative example, component 224 includes prior level of composite material 254. Prior level of composite material 254 is laid down prior to composite material 210. Inconsistency allowance threshold 226 may take into account at least one of a quantity of inconsistencies identified in prior level of composite material 254 of component 224, types of inconsistencies identified in prior level of composite material 254 of component 224, or locations of inconsistencies identified in prior level of composite material 254 of component 224. Inconsistency allowance threshold 226 may be modified depending on inconsistencies identified in a prior level. For example, inconsistency allowance threshold 226 may be raised or lowered depending on inconsistencies in prior level of composite material 254.

Database 218 includes data for making number of metrology decisions 225. As depicted, metrology data 256 and historical performance data 258 are within database 218.

Data regarding prior level of composite material 254 is present in metrology data 256 within database 218. Metrology data 256 also includes any other desirable inspection data for component 224. In some illustrative examples, inconsistency allowance threshold 226 is modified based on metrology data 256.

In some illustrative examples, inconsistency allowance threshold 226 is modified based on historical performance data 258 of other components. Historical performance data 258 includes performance outcomes for components having the same design as component 224.

As depicted, system 202 also includes display 260. In some illustrative examples, computer system 208 is configured to show image data 212 on display 260 in real-time with a width and a length superimposed over each of inconsistencies 214 that is visible within image data 212 on display 260. As depicted, inconsistencies 214 include inconsistency 262 and inconsistency 264. Inconsistency 262 is shown on display 260 in real-time with width 266 and length 268 superimposed over inconsistency 262. Inconsistency 264 is shown on display 260 in real-time with width 270 and length 272 superimposed over inconsistency 264.

In some illustrative examples, only designated types of inconsistencies 214 have a width and a length superimposed. In these illustrative examples, some types of inconsistencies 214 may not be marked within image data 212 on display 260. One example may be seen below in FIG. 5.

Computer system 208 may be comprised of one or more computers that may be in communication with each other. Computer system 208 may include database 218. Depending on the implementation, computer system 208 may be implemented using hardware, software, firmware, or a combination thereof.

Computer system 208 may perform any desirable image processing on image data 212 to identify and measure inconsistencies 214. In some illustrative examples, image processing may include at least one of setting color to gray, performing a Gaussian blur, using a canny edge detector, dilation, or erosion. During image processing, for each respective inconsistency of inconsistencies 214, computer system 208 performs at least one of finding the contours of the inconsistency, sorting the contours, or checking the contour size. Prior to displaying inconsistencies 214 on display 260 at least one of bounding box of the contour is computed, midpoints are calculated, lines are drawn between the midpoints, and pixels are set per metric scaling.

The image processing techniques disclosed are not meant to imply limitations. Any desirable image processing techniques may be performed in any desirable order.

The illustration of manufacturing environment 200 in FIG. 2 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, although computer system 208 is depicted as present in manufacturing environment 200, in other illustrative examples, computer system 208 may be present outside of manufacturing environment 200. Further, although database 218 is depicted on computer system 208, in other illustrative examples, database 218 may be present on a separate computer system.

As another example, inconsistencies 214 within image data 212 are a subset of inconsistencies 276 identified in composite material 210. When inconsistency allowance threshold 226 is modified based on properties 228 of inconsistencies 214, inconsistency allowance threshold 226 may be modified based on properties of all of inconsistencies 276. For example, modifying inconsistency allowance threshold 226 may take into account not only randomness 238 of inconsistencies 214 but also randomness of all of inconsistencies 276. As another example, modifying inconsistency allowance threshold 226 may take into account both inconsistency type 236 of inconsistencies 214 and inconsistency types present in inconsistencies 276.

Figure 3:
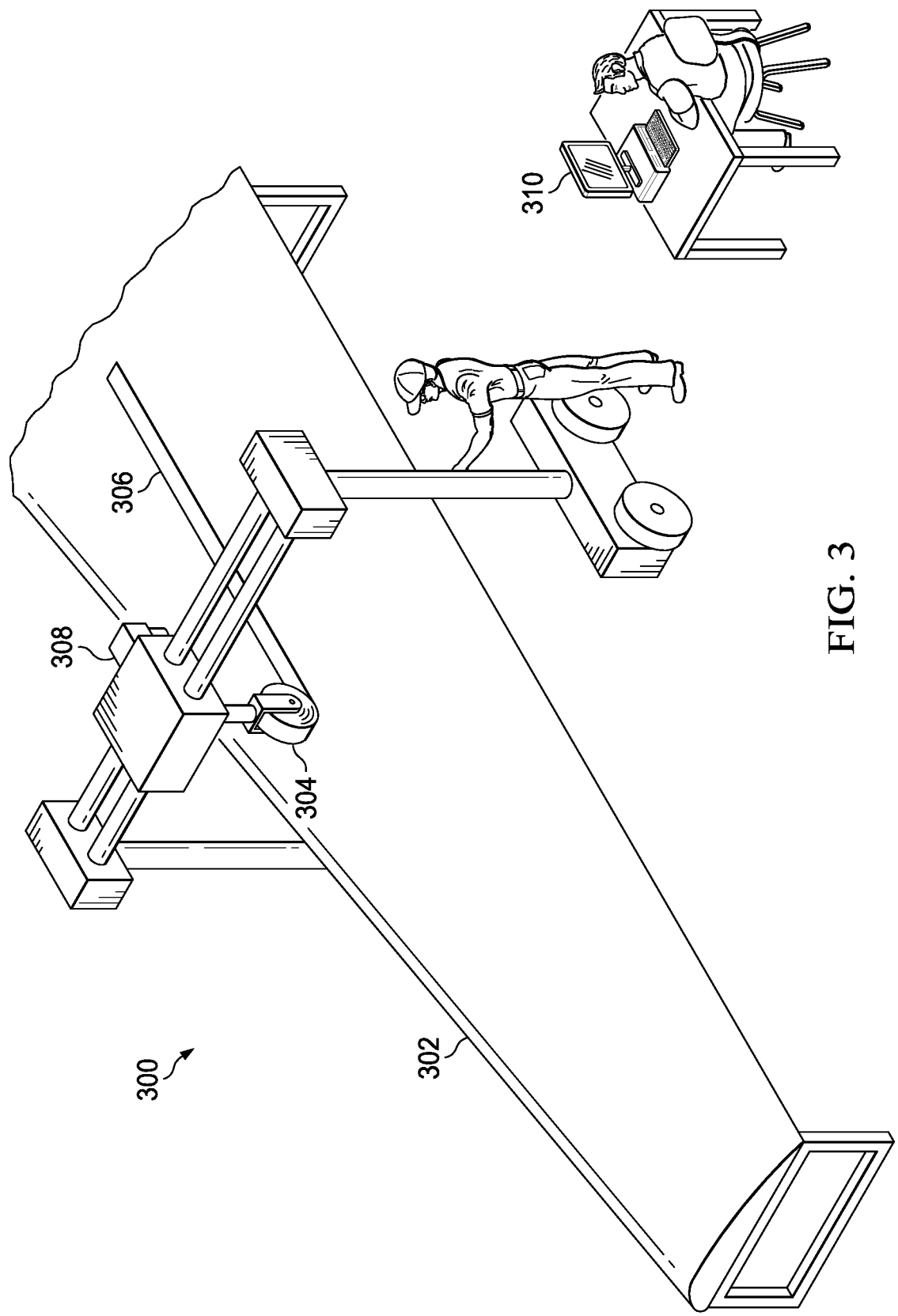
FIG. 3 is an illustration of a manufacturing environment in accordance with an illustrative embodiment.

Turning now to FIG. 3, an illustration of a manufacturing environment is depicted in accordance with an illustrative embodiment. Manufacturing environment 300 is a physical implementation of manufacturing environment 200 depicted in block format in FIG. 2. Portions of aircraft 100 may be manufactured in manufacturing environment 300.

Manufacturing environment 300 includes component 302 and automated composite placement head 304. Automated composite placement head 304 is configured to lay down composite material 306 onto component 302. As depicted, composite material 306 takes the form of prepreg tape. However, composite material 306 may take any desirable form, including, but not limited to, prepreg tape, dry fibers, prepreg fibers, dry preforms, tows, slits, or sheets.

In this illustrative example, vision system 308 is connected to automated composite placement head 304. As automated composite placement head 304 lays composite material 306 onto component 302, vision system 308 may image composite material 306. Thus, an inspection step may be performed substantially simultaneously to a composite layup step. Although vision system 308 is connected to automated composite placement head 304, the inspection step may take place after composite material 306 is fully laid down. Thus, the inspection step may take place after a composite material laying step.

Manufacturing environment 300 also includes display 310. As composite material 306 is inspected, image data is shown on display 310. Inconsistencies in composite material 306 visible within image data are shown on display 310.

Figure 4:
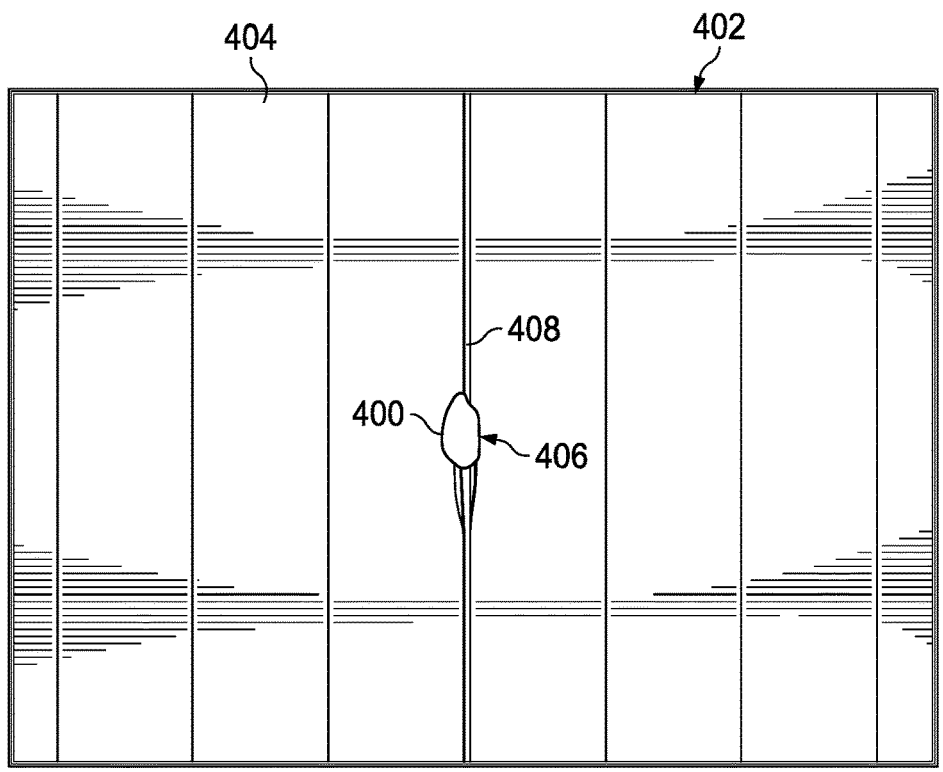
FIG. 4 is an illustration of an inconsistency in accordance with an illustrative embodiment.

Turning now to FIG. 4, an illustration of an inconsistency is depicted in accordance with an illustrative embodiment. Inconsistency 400 is a physical implementation of one of inconsistencies 214 of FIG. 2. Image data 402 may be an implementation of image data 212 of FIG. 2. Image data 402 may be an image of a portion of component 302 of FIG. 3. Image data 402 may be formed during an inspection of a component of aircraft 100 of FIG. 1.

Inconsistency 400 is visible within image data 402 of composite material 404. As depicted, inconsistency 400 is foreign object debris 406. As depicted, foreign object debris 406 has formed gap 408 around foreign object debris 406.

Figure 5:
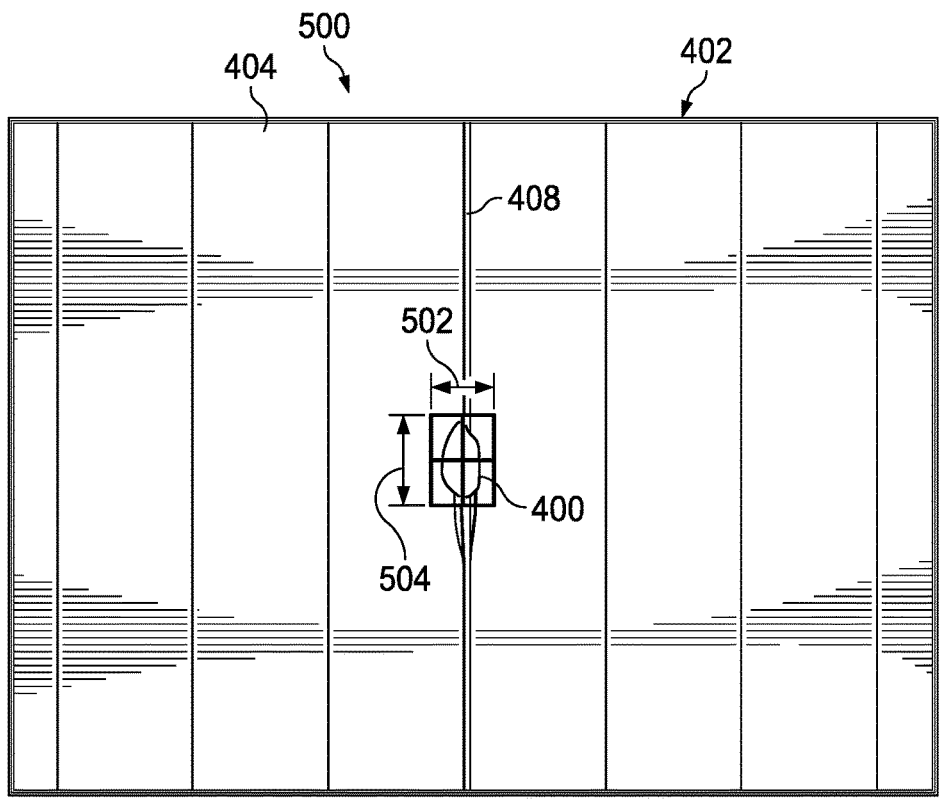
FIG. 5 is an illustration of an inconsistency with a width and a length superimposed in accordance with an illustrative embodiment.

Turning now to FIG. 5, an illustration of an inconsistency with a width and a length superimposed is depicted in accordance with an illustrative embodiment. View 500 is a view of inconsistency 400 after inconsistency 400 was identified in image data 402 of composite material 404. Width 502 and length 504 are superimposed over inconsistency 400.

In view 500, width 502 and length 504 are superimposed over foreign object debris 406. In view 500, gap 408 formed by foreign object debris 406 does not have measurements superimposed. Gap 408 is not marked. In some illustrative examples, gap 408 is identified and measured but not marked. In some illustrative examples, gap 408 is identified in image data 402 but not measured or marked. In some illustrative examples, gap 408 is not identified, measured, or marked.

A computer system, such as computer system 208 of FIG. 2, is configured to detect any desirable type of inconsistency. In some illustrative examples, some types of inconsistencies may be designated to not be identified within the image data.

In some illustrative examples, some types of inconsistencies may be designated to not be measured. The types of inconsistencies may be designated by a computer system, such as computer system 208 of FIG. 2 or by a human operator.

In some illustrative examples, some types of inconsistencies may be designated to not have measurements superimposed in the image data. The types of inconsistencies may be designated by a computer system, such as computer system 208 of FIG. 2 or by a human operator. In some illustrative examples, a computer system, such as computer system 208 of FIG. 2, only marks designated types of inconsistencies in image data.

As depicted in view 500, gaps may be an inconsistency type designated by a computer system, such as computer system 208 of FIG. 2, or by a human operator to not have measurements superimposed. In some illustrative examples, gaps may be identified and measured but not have measurements superimposed. In some illustrative examples, gaps may be identified but not measured. In other illustrative examples, a computer system, such as computer system 208 of FIG. 2, may be configured to not identify gaps, such as gap 408. In each of these illustrative examples, the designations may be set by a computer system, such as computer system 208 of FIG. 2, or by a human operator.

The types of inconsistencies to be at least one of identified, measured, or marked in image data may be selected based on at least one of the type of material, a level of material, a location on a component, or any other desirable characteristic. The types of inconsistencies to not be at least one of identified, measured, or marked in image data may be selected based on at least one of the type of type of material, a level of material, a location on a component, or any other desirable characteristic.

View 500 is representative of a view presented on a display (not depicted) to a human operator in real-time during inspection of composite material 404. As the vision system (not depicted) moves relative to composite material 404, the image data displayed will change. For example, when the vision system (not depicted) is a video camera, inconsistency 400 will move across the display screen as the vision system moves relative to composite material 404.

Figure 6:
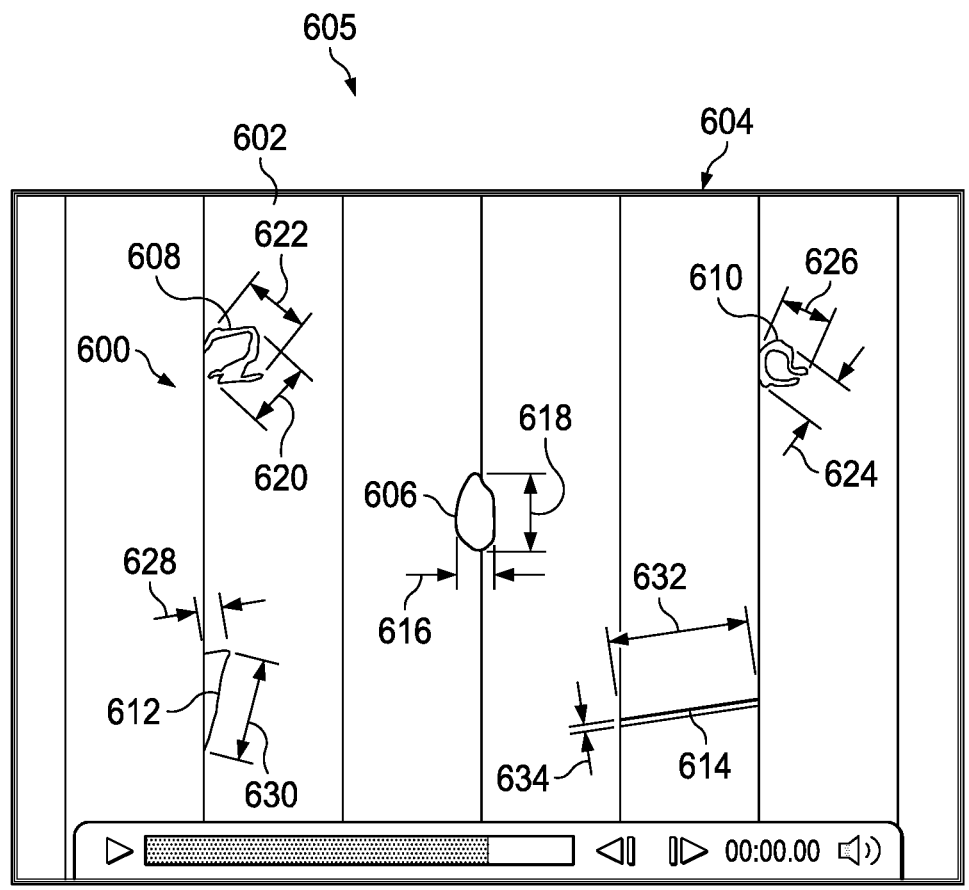
FIG. 6 is an illustration of inconsistencies each with a width and a length superimposed in accordance with an illustrative embodiment.

Turning now to FIG. 6, an illustration of inconsistencies each with a width and a length superimposed is depicted in accordance with an illustrative embodiment. Inconsistencies 600 are a physical implementation of inconsistencies 214 of FIG. 2. Image data 604 may be an implementation of image data 212 of FIG. 2. Image data 604 may be an image of a portion of component 302 of FIG. 3. Image data 402 may be formed during an inspection of a component of aircraft 100 of FIG. 1.

Inconsistencies 600 in composite material 602 visible within image data 604 have been identified. View (605) is representative of a view presented on a display to a human operator in real-time during inspection of composite material 602. The inspection of composite material 602 may take place as an automated composite placement head (not depicted) is laying down composite material 602. In another example, the inspection of composite material 602 may take place after the automated composite placement head (not depicted) has laid down all the composite material in a ply, including composite material 602 in image data 604.

Inconsistencies 600 of image data 604 includes foreign object debris 606, fuzz ball 608, fuzz ball 610, folded tow 612, and end of ply inconsistency 614. As depicted, a width and a length are superimposed over each of inconsistencies 600 visible within image data 604 on the display (not depicted).

For example, width 616 and length 618 are superimposed over foreign object debris 606. As another example, width 620 and length 622 are superimposed over fuzz ball 608. As depicted, a respective width and length of an inconsistency are not governed by the axis of composite material 602 being laid down. Further, a respective width and length are also not governed by an axis of the display screen. As depicted, a respective length of an inconsistency is the longest distance of the inconsistency. Width 620 and length 622 are not dependent on an orientation of composite material 602 or a display screen for image data 604.

Width 624 and length 626 are superimposed over fuzz ball 610. Width 628 and length 630 are superimposed over folded tow 612. Length 632 and width 634 are superimposed over end of ply inconsistency 614.

The different components shown in FIG. 1 and FIGS. 3-6 may be combined with components in FIG. 2, used with components in FIG. 2, or a combination of the two. Additionally, some of the components in FIG. 1 and FIGS. 3-6 may be illustrative examples of how components shown in block form in FIG. 2 may be implemented as physical structures.

Figure 7:
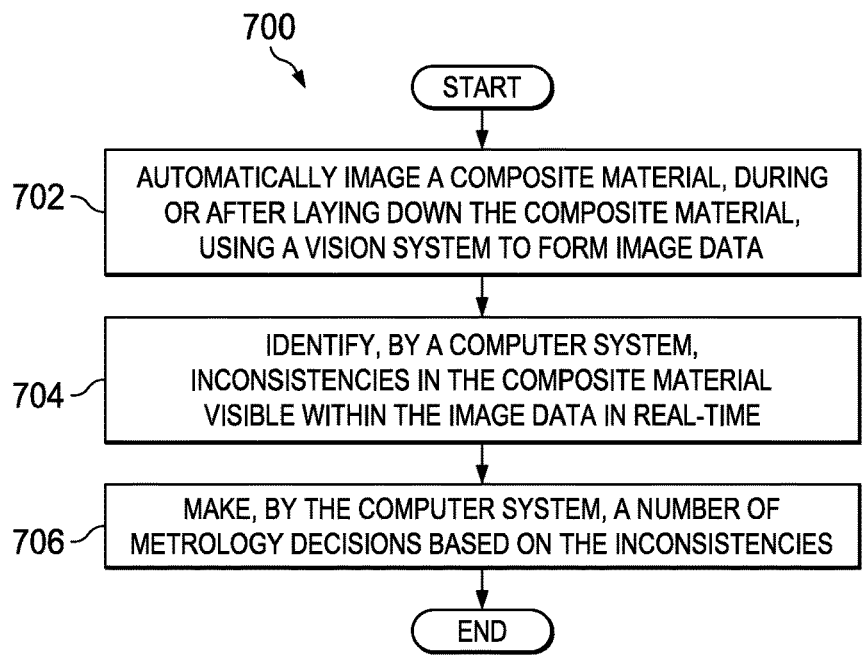
FIG. 7 is an illustration of a flowchart of a method for providing process control to composite fabrication in accordance with an illustrative embodiment.

Turning now to FIG. 7, an illustration of a flowchart of a method for providing process control to composite fabrication is depicted in accordance with an illustrative embodiment. Method 700 may be used to inspect a component of aircraft 100 of FIG. 1. Method 700 may be used to image composite material 210 of FIG. 2 and make number of metrology decisions 225 based on inconsistencies 214 of FIG. 2 within composite material 210. Method 700 may be implemented within manufacturing environment 300 using vision system 308 of FIG. 3. Method 700 may produce image data 402 of FIG. 4. Method 700 may produce image data 604 of FIG. 6.

Method 700 automatically images a composite material, during or after laying down the composite material, using a vision system to form image data (operation 702). Method 700 identifies, by a computer system, inconsistencies in the composite material visible within the image data in real-time (operation 704).

Method 700 makes, by the computer system, a number of metrology decisions based on the inconsistencies (operation 706). Afterwards, the method terminates.

The computer system makes the number of metrology decisions without input from a human operator. The computer system makes the number of metrology decisions in real time. In some illustrative examples, when the composite material is imaged as composite material is being laid down, the computer system makes the number of metrology decisions in-process.

In some illustrative examples, making the number of metrology decisions includes sending out a warning when an inconsistency of the inconsistencies identified in the image data violates an inconsistency allowance threshold. An inconsistency may violate an inconsistency allowance threshold based on at least one of the inconsistency's size, location, type, or some other property of the inconsistency. For example, the inconsistency may violate the inconsistency allowance threshold when the inconsistency allowance threshold is a size and the inconsistency is larger than the inconsistency allowance threshold.

In another example, an inconsistency may violate an inconsistency allowance threshold when taking into account properties of other inconsistencies. When taking into account other inconsistencies, an inconsistency may violate an inconsistency allowance threshold based on properties of the group, such as density, spacing, same type, same size, or other properties of the group inconsistencies. In one illustrative example, the inconsistency allowance threshold is a density of inconsistencies, and the location of the inconsistency relative to other inconsistencies creates a density of inconsistencies that violates the inconsistency allowance threshold. In another illustrative example, an inconsistency may violate an inconsistency allowance threshold based on frequency, which takes into account a count of inconsistencies as well as the location, density, type, and shape of the inconsistencies in image data.

In some illustrative examples, the composite material is part of a component. In these illustrative examples, the inconsistency allowance threshold may take into account at least one of a quantity of inconsistencies identified in a prior level of composite material of the component, types of inconsistencies identified in a prior level of composite material of the component, or locations of inconsistencies identified in a prior level of composite material of the component.

The inconsistency allowance threshold may be raised or lowered depending on the inconsistencies identified in the prior level. For example, if a high density of inconsistencies is present in a location of a prior level of composite material, the allowable density of inconsistencies over this location in the current composite material, expressed as an inconsistency allowance threshold, may be lower than if a high density of inconsistencies was not present in the location. As another example, an allowable quantity of large inconsistencies, expressed as an inconsistency allowance threshold, may be higher if less than a predicted quantity of large inconsistencies were present in a prior level of composite material.

In some illustrative examples, making the number of metrology decisions includes modifying an inconsistency allowance threshold while imaging the composite material. The inconsistency allowance threshold is modified based on properties of the inconsistencies identified in the image data including at least one of locations of the inconsistencies, a quantity of the inconsistencies, a density of the inconsistencies, or a measure of randomness of the inconsistencies. In some illustrative examples, a frequency of the inconsistencies may be used. The frequency may take into account the location, density, type, and shape of the inconsistencies in image data. When used, the frequency of inconsistencies in image data may be compared to the frequency of inconsistencies in historical data for other composite layers of the component. For example, increased frequency of inconsistencies in several layers of one portion of the component may violate an inconsistency allowance threshold.

In one illustrative example, if the quantity of inconsistencies identified while laying down the composite material is higher than anticipated, the inconsistency allowance threshold may be lowered to trigger a warning earlier during the manufacturing process. By triggering the warning earlier, there may be less waste and a lower manufacturing time. For example, by triggering the warning earlier, laying down composite material may be stopped prior to completing a full ply of the composite material. By stopping prior to completing the full ply of composite material, a volume of material to be reworked may be reduced, thus reducing waste. Further, by stopping prior to completing the full ply of composite material, the additional manufacturing time of completing the ply is not expended.

As another illustrative example, if a density of inconsistencies is high in one location, an overall quantity of inconsistencies of the inconsistency allowance threshold may be increased so that the warning is not triggered by the dense location of inconsistencies. As a further example, a degree of randomness of inconsistencies detected may be greater than anticipated. When the degree of randomness of inconsistencies is considerably greater than anticipated, the inconsistency allowance threshold may be increased to more closely represent the actual degree of randomness present during inspection.

In some illustrative examples, the composite material is part of a component, and the inconsistency allowance threshold is modified based on a design of the component. The design of the component may include any desirable features of the component, such as thickness, locations of strain, locations associated with electronic components, locations of joints, required strength, contours, complexity of contours, penetrations, or other design features of the component.

For example, the inconsistency allowance threshold may be lowered for density of inconsistencies in a thinner region of the component. By lowering the inconsistency allowance threshold, there is a lower acceptable density in this thinner region of the component than in thicker regions of the component.

In some illustrative examples, support structures, such as fasteners, may be present in a completed component. When support structures are in the design for the component, the inconsistency allowance threshold may take into account the presence of fastener holes.

In some illustrative examples, the inconsistency allowance threshold is modified based on historical performance data of other components. For example, the inconsistency allowance threshold for a quantity of large inconsistencies may be lowered based on an estimate of the performance of the current component with the identified inconsistencies. The estimate of the performance is based on performance data, such as strength data, of other components having similar inconsistencies. In these examples, the historical performance data of components having the same design is used to estimate a current performance of the current component based on the identified inconsistencies and modify the inconsistency allowance threshold such that current component meets desired performance characteristics if the current component does not violate the inconsistency allowance threshold.

As another example, the inconsistency allowance threshold may be modified based on modifying the design of the component. In some illustrative examples, additional composite levels may be added to the design of the component. An inconsistency allowance threshold may take into account thickness of the component. An inconsistency allowance threshold may be greater when more material is present. Thus, an inconsistency allowance threshold may take into account frequency of inconsistencies, pattern of inconsistencies, and thickness of the component. If the thickness of the component changes, the inconsistency allowance threshold may also be modified.

As another illustrative example, making the number of metrology decisions includes suggesting the use of additional support structures. For example, making the number of metrology decisions may include making recommendations to include a larger quantity of fasteners in a component based on identified inconsistencies.

Figure 8:
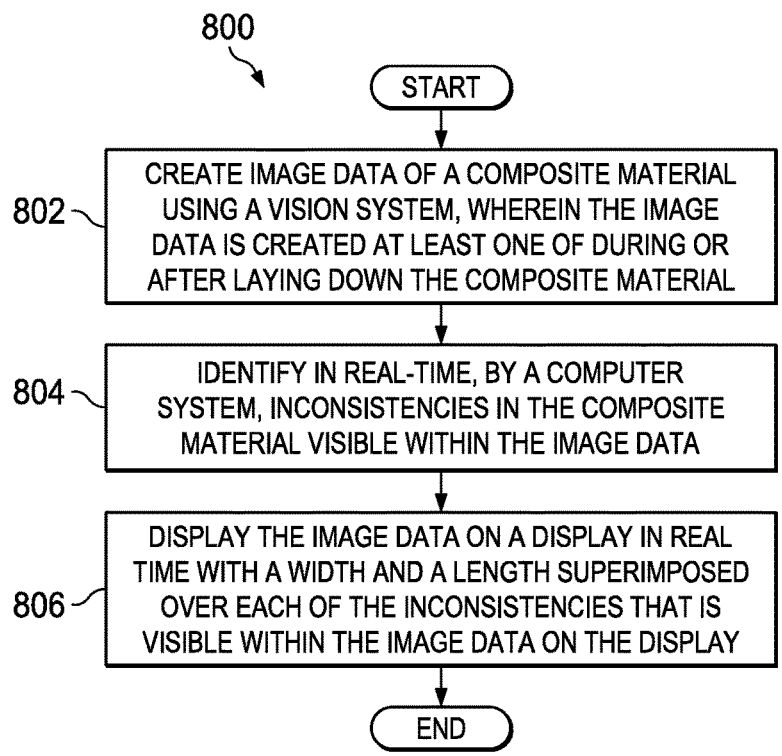
FIG. 8 is an illustration of a flowchart of a method for identifying and displaying inconsistencies in accordance with an illustrative embodiment.

Turning now to FIG. 8, an illustration of a flowchart of a method for identifying and displaying inconsistencies is depicted in accordance with an illustrative embodiment. Method 800 may be used to inspect a component of aircraft 100 of FIG. 1. Method 800 may be used to image composite material 210 of FIG. 2 and display inconsistencies in composite material 210 within image data 212 of FIG. 2. Method 800 may be implemented within manufacturing environment 300 using vision system 308 and display 310 of FIG. 3. Method 800 may produce at least one of view 500 of FIG. 5 or image data 604 of FIG. 6.

Method 800 creates image data of a composite material using a vision system, wherein the image data is created at least one of during or after laying down the composite material (operation 802). Method 800 identifies, by a computer system, inconsistencies in the composite material visible within the image data in real-time (operation 804). Method 800 displays the image data on a display in real-time with a width and a length superimposed over each of the inconsistencies that is visible within the image data on the display (operation 806). Afterwards, the method terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

For example, method 700 may further comprise storing data for the inconsistencies in a database, building machine learning datasets and probabilistic information using the database, and using the machine learning datasets and probabilistic information to forecast a quality of a portion of a component containing the composite material. The forecast takes into account at least one of historical data for other components, the design of the component, or the inconsistencies identified in the composite material.

In another illustrative example, method 700 further comprises displaying the image data in real-time with a width and a length superimposed over each of the inconsistencies that is visible within displayed image data. Displaying the image data in real-time allows operators to monitor the types of inconsistencies, locations of inconsistencies, and size of inconsistencies in real-time.

In one illustrative example, method 700 further comprises assigning an inconsistency type, by the computer system, to each of the inconsistencies identified in the image data. By assigning the inconsistency type, additional information about the inconsistencies present on the composite material is provided to the computer system. With greater amounts of information, the computer system may better control and monitor a composite fabrication process. Further, by assigning the inconsistency type, the computer system may be able to diagnose out of tolerance conditions in specific types of materials, specific manufacturing tools, or in specific areas of a manufacturing environment.

In another illustrative example, the inconsistencies identified in the image data are measured. Measurements of the inconsistencies may have any desirable tolerance. In some illustrative examples, measuring the inconsistencies identified in the image data comprises measuring the inconsistencies to the nearest ±0.01 inch. In some illustrative example, measuring the inconsistencies identified in the image data comprises measuring the inconsistencies to the nearest ±0.10 inch.

As another example, method 800 may further comprise making, by the computer system, number of metrology decisions based on the inconsistencies, historical performance data, and a design of a component wherein the composite material is a part of the component. In some illustrative examples, the number of metrology decisions comprises adjusting composite lay down parameters for the composite material or a future ply. For example, a metrology decision may be to change at least one of lay down speed, lay down angle, composite compaction pressure, heat applied during lay down, cutting speed, cutting angle for a current or future ply. In some illustrative examples, composite lay down parameters of the current ply are changed in real time. In these illustrative examples, composite lay down parameters for a composite material are changed as the composite material is being laid down.

In some illustrative examples, the computer system is configured to analyze the image data and make a decision to change composite lay down parameters independent of a human operator. The computer system is configured to analyze the image data and determine if changing composite lay down parameters is desirable in-real time.

As another example, method 800 may further comprise modifying, by the computer system, an inconsistency allowance threshold while imaging the composite material, wherein the inconsistency allowance threshold is modified based on the inconsistencies identified in the image data.

Figure 9:
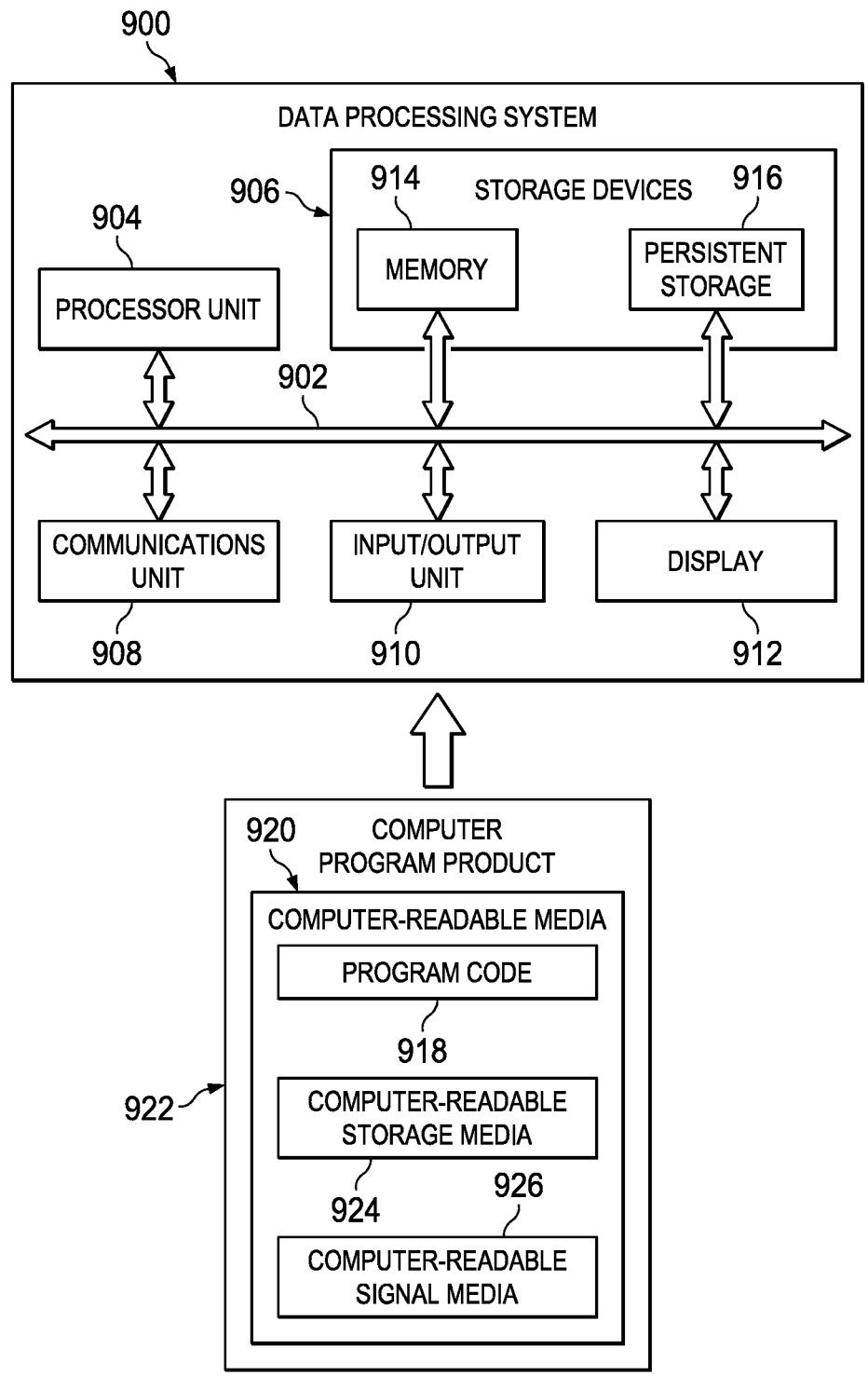
FIG. 9 is an illustration of a data processing system in the form of a block diagram in accordance with an illustrative embodiment.

Turning now to FIG. 9, an illustration of a data processing system in the form of a block diagram is depicted in accordance with an illustrative embodiment. Data processing system 900 may be used to implement computer system 208 of FIG. 2. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multi-processor core, and/or some other suitable type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer-readable storage device, is any piece of hardware capable of storing information on a temporary and/or permanent basis. This information may include, but is not limited to, data, a program code, and/or other types of information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory drive, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from, and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative embodiments may be performed by processor unit 904 using computer-implemented instructions. These instructions may be referred to as a program code, a computer-usable program code, or a computer-readable program code, and may be read and executed by one or more processors in processor unit 904.

In these examples, program code 918 is located in a functional form on computer-readable media 920, which is selectively removable, and may be loaded onto or transferred to data processing system 900 for execution by processor unit 904. Program code 918 and computer-readable media 920 together form computer program product 922. In this illustrative example, computer-readable media 920 may be computer-readable storage media 924 or computer-readable signal media 926.

Computer-readable storage media 924 is a physical or tangible storage device used to store program code 918, rather than a medium that propagates or transmits program code 918. Computer-readable storage media 924 may be, for example, without limitation, an optical or magnetic disk, or a persistent storage device that is connected to data processing system 900.

Alternatively, program code 918 may be transferred to data processing system 900 using computer-readable signal media 926. Computer-readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the illustrative embodiments may be implemented. The different illustrative embodiments may be implemented in a data processing system that includes components, in addition to or in place of those illustrated, for data processing system 900. Further, components shown in FIG. 9 may be varied from the illustrative examples shown.

Illustrative embodiments of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 of FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during component and subassembly manufacturing 1006 of FIG. 10. For example, system 202 of FIG. 2 may be used during component and subassembly manufacturing 1006 to inspect composite material 210 of FIG. 2. Image data 212 of FIG. 2 may be formed during component and subassembly manufacturing 1006 using method 700 of FIG. 7. System 202 of FIG. 2 may be used to inspect any desirable portion of airframe 1102 or interior 1106. In some illustrative examples, any desirable portion of airframe 1102 or interior 1106 may be inspected using system 202 of FIG. 2 during system integration 1008 of aircraft 1100. Component 224 of FIG. 2 to be inspected using system 202 may be replacement components inspected during maintenance and service 1014 of FIG. 10. In some illustrative examples, replacement components of airframe 1102 or interior 1106 may be inspected using system 202 of FIG. 2. The replacement components may be inspected using method 700 of FIG. 7 or method 800 of FIG. 8 during maintenance and service 1014 of FIG. 10.

The illustrative embodiments present an in-process economical intelligent camera system using computer vision, video data analytics/tools, and machine learning. A single non-intrusive system recognizes, identifies, and records inconsistencies during the composite lamination process for comparison to inconsistency allowances. In addition, this system can be taught to modify data collection as allowances for inconsistencies are revised based on improved process performance. The illustrative examples may eliminate a ply sequence by ply sequence walk around a part and recording findings for later evaluation by a manufacturing technician. Elimination of a ply sequence by ply sequence walk around would result in labor and flow-time reduction.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for process control of a composite fabrication process comprising:
   an automated composite placement head configured to lay down composite material;
   a vision system connected to the automated composite placement head and configured to produce image data during an inspection of the composite material, wherein the inspection takes place at least one of during or after laying down the composite material;
   a computer system configured to identify inconsistencies in the composite material visible within the image data, and make a number of metrology decisions automatically, without operator intervention, based on the inconsistencies; and
   a display, wherein the computer system is configured to show the image data on the display in real-time with a width and a length superimposed over each of the inconsistencies that is visible within the image data on the display.

2. The system of claim 1, wherein the computer system is further configured to store data for the inconsistencies in a database, build machine learning datasets and probabilistic information using the database, and use the machine learning datasets and probabilistic information to forecast a quality of a portion of component containing the composite material.

3. The system of claim 2, wherein the computer system is configured to make the number of metrology decisions while the automated composite placement head is laying down the composite material.

4. The system of claim 1, wherein the number of metrology decisions comprises modifying an inconsistency allowance threshold, wherein the computer system is configured to employ a probabilistic approach to modify the inconsistency allowance threshold while imaging the composite material, wherein the inconsistency allowance threshold is modified based on at least one property of the inconsistencies identified in the image data, wherein properties of inconsistencies include at least one of size, density, location, inconsistency type, or randomness.

5. The system of claim 4, wherein the inconsistency allowance threshold includes at least one of a quantity of total inconsistencies, a quantity of a specific type of inconsistencies, a size of an inconsistency, a size of a specific type of inconsistency, a density of inconsistencies, or a density of a specific type of inconsistencies.

6. The system of claim 1, wherein the composite material is a part of a component, wherein the computer system is configured to compare locations of the inconsistencies identified in the image data to a design of the component.

7. The system of claim 1, wherein the number of metrology decisions comprises adjusting composite lay down parameters for the composite material or a future ply.

8. A method comprising:
automatically imaging a composite material, during or after laying down the composite material, using a vision system to form image data;
identifying, by a computer system, inconsistencies in the composite material visible within the image data in real-time;
making, by the computer system, a number of metrology decisions automatically, without operator intervention, based on the inconsistencies; and
displaying the image data in real-time with a width and a length superimposed over each of the inconsistencies that is visible within displayed image data.

9. The method of claim 8 further comprising:
storing data for the inconsistencies in a database;
building machine learning datasets and probabilistic information using the database; and
using the machine learning datasets and the probabilistic information to forecast a quality of a portion of a component containing the composite material.

10. The method of claim 8, wherein making the number of metrology decisions includes:
sending out a warning when an inconsistency of the inconsistencies identified in the image data violates an inconsistency allowance threshold.

11. The method of claim 10, wherein the composite material is part of a component, wherein the inconsistency allowance threshold takes into account at least one of a quantity of inconsistencies identified in a prior level of composite material of the component, types of inconsistencies identified in a prior level of composite material of the component, or locations of inconsistencies identified in a prior level of composite material of the component.

12. The method of claim 8, wherein making the number of metrology decisions includes:
modifying an inconsistency allowance threshold while imaging the composite material, wherein the inconsistency allowance threshold is modified based on properties of the inconsistencies identified in the image data including at least one of locations of the inconsistencies, a quantity of the inconsistencies, a density of the inconsistencies, or a measure of randomness of the inconsistencies.

13. The method of claim 12, wherein the composite material is part of a component, and wherein the inconsistency allowance threshold is modified based on a design of the component.

14. The method of claim 13, wherein the inconsistency allowance threshold is modified based on historical performance data of other components.

15. The method of claim 8 further comprising:
assigning an inconsistency type, by the computer system, to each of the inconsistencies identified in the image data.

16. The method of claim 8 further comprising:
measuring the inconsistencies identified in the image data.

17. The method of claim 8, wherein the number of metrology decisions comprises adjusting composite lay down parameters for the composite material or a future ply.

18. A method comprising:
creating image data of a composite material using a vision system, wherein the image data is created at least one of during or after laying down the composite material;
identifying in real-time, by a computer system, inconsistencies in the composite material visible within the image data; and
displaying the image data on a display in real-time with a width and a length superimposed over each of the inconsistencies that is visible within the image data on the display.

19. The method of claim 18 further comprising:
making, by the computer system, a number of metrology decisions based on the inconsistencies, historical performance data, and a design of a component wherein the composite material is a part of the component.

20. The method of claim 19, wherein the number of metrology decisions comprises adjusting composite lay down parameters for the composite material or a future ply.

21. The method of claim 18 further comprising:
modifying, by the computer system, an inconsistency allowance threshold while imaging the composite material, wherein the inconsistency allowance threshold is modified based on the inconsistencies identified in the image data.

22. The method of claim 21, wherein the inconsistency allowance threshold includes at least one of a quantity of total inconsistencies, a quantity of a specific type of inconsistencies, a size of an inconsistency, a size of a specific type of inconsistency, a density of inconsistencies, or a density of a specific type of inconsistencies.

23. The method of claim 18, wherein the computer system is further configured to store data for the inconsistencies in a database, build machine learning datasets and probabilistic information using the database, and use the machine learning datasets and probabilistic information to forecast a quality of a portion of component containing the composite material.

* * * * *